STONE & ARCHIBALD.
Corn Planter.
No. 1,087, 32,091.
Patented Apr. 16, 1861.
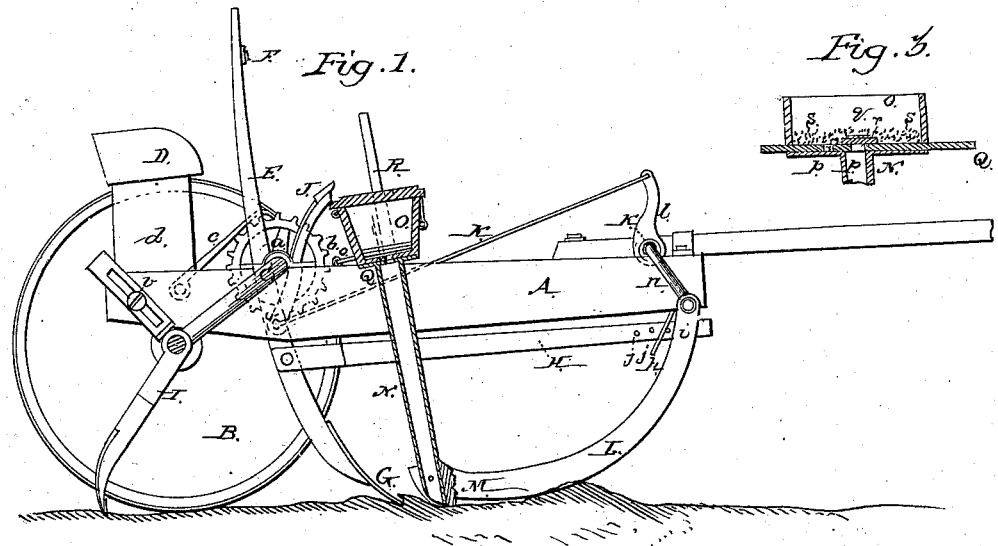
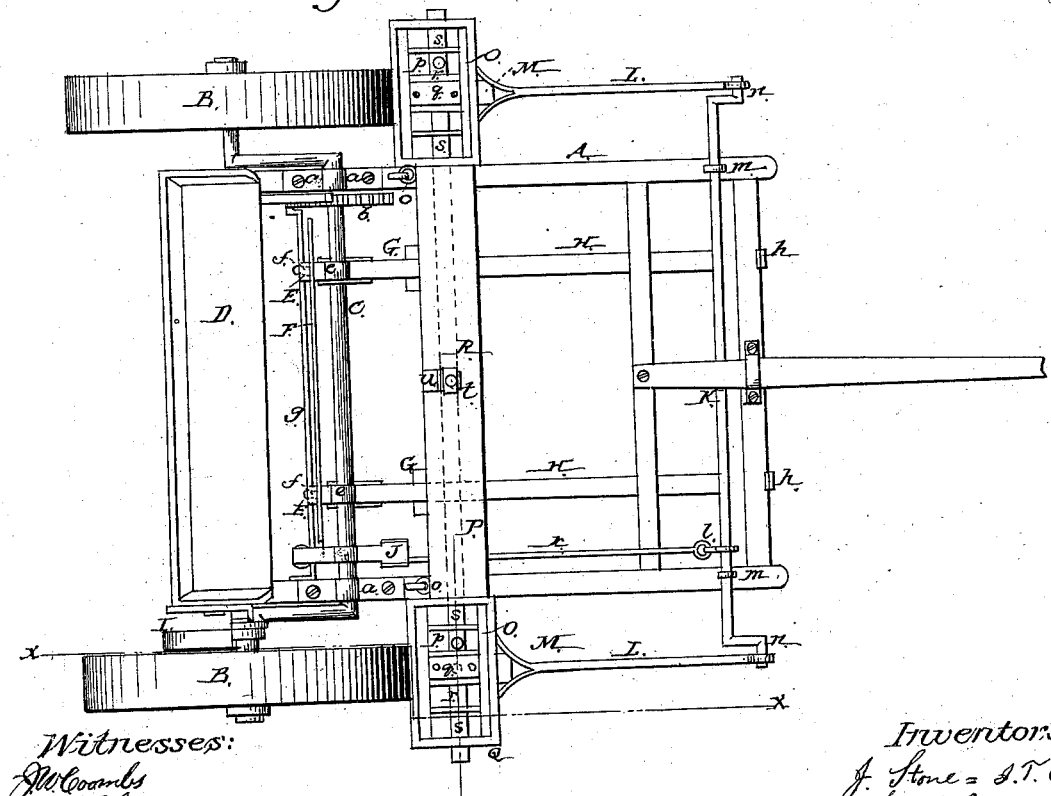

UNITED STATES PATENT OFFICE.

J. STONE AND J. T. ARCHIBALD, OF WAPELLO, IOWA.

IMPROVEMENT IN CORN-PLANTERS.

Specification forming part of Letters Patent No. 32,091, dated April 16, 1861.

*To all whom it may concern:*

Be it known that we, JOSEPH STONE and JAMES T. ARCHIBALD, of Wapello, in the county of Louisa and State of Iowa, have invented a new and Improved Combined Corn Planter and Cultivator; and we do hereby declare that the following is a full, clear, and exact description of the same, reference being had to the annexed drawings, making a part of this specification, in which—

Figure 1 is a side sectional view of our invention, taken in the line $x\ x$, Fig. 2. Fig. 2 is a plan or top view of the same. Fig. 3 is a detached longitudinal section of one of the hoppers, taken in the line $y\ y$, Fig. 2.

Similar letters of reference indicate corresponding parts in the several figures.

This invention relates to a novel and improved arrangement of parts, as hereinafter fully shown and described, whereby the driver or operator has complete control over the machine, the furrow-shares being allowed to be raised temporarily at the will of the driver or operator, and the whole framing of the machine also allowed to be raised bodily when required. Provision is also made to insure the proper distribution of the seed and the ready adjustment of the shares.

To enable those skilled in the art to fully understand and construct our invention, we will proceed to describe it.

A represents a rectangular frame, which is mounted on two wheels, B B, the axle C of which is bent in crank form, as shown clearly in Fig. 2, and is fitted loosely in bearings $a\ a$ on the frame A. The wheels B B are placed loosely on the outer ends of the crank parts of the axle, and on the axle there is secured a toothed wheel, $b$, with which a pawl, $c$, attached to frame A, engages.

At the back part of the frame A there are two uprights, $d\ d$, one at each side, which support a driver's's seat, D, and to the axle C there are attached, by two eyes, $e\ e$, two curved bars, E E, the upper ends of which are connected by a bar, F. The bars E E are allowed to swing laterally on pins $f\ f$, attached to the eyes $e\ e$, said pins passing through a bar, $g$, which may be perforated with a series of holes in order to admit of the bars E E being adjusted nearer together or farther apart, as may be desired.

To the lower end of each bar E a plow, G, is attached, and to each bar E, just below its connection with the axle C, there is attached by a bolt a bar, H. The front ends of these bars pass through loops or guides $h\ h$ at the front part of the frame A, and have pins $i$ passing through them in front of the loops or guides, the pins $i$ passing through either of a series of holes, $j$, in the bars H, and by adjusting these pins the bars E, and consequently their plows, may have a greater or less inclined position, as may be desired.

On the axle C there is placed loosely a pendent bar, I, the lower end of which is slightly curved and is in contact with the ground at a point back of the axle, as shown clearly in Fig. 1. On the axle C there is also placed loosely a treadle, J, the back end of which is connected by a rod, $k$, to the upper end of an arm, $l$, which is attached to a shaft, K, on the front part of the frame A. The shaft K is allowed to turn freely in its bearings $m$, and at its outer ends there are cranks $n\ n$, to which the upper ends of curved cutters L L are attached. The lower ends of the cutters L L are connected to furrow-shares M M, and the furrow-shares are secured to the lower ends of tubes N N, which serve to convey seed from hoppers O O to the furrows made by the shares M M. The hoppers O are attached to the ends of a bar, P, which is secured at its back edge to the frame A by joints $o$.

To the under side of the bar P there is secured a slide-bar, Q, which extends through the bottoms of the hoppers O O and is allowed to slide freely back and forth. The slide-bar Q is perforated with two holes, $p\ p$, at each end, and within each hopper O, at about its center, there is placed a cross-plate, $g$, which has an india-rubber strip, $r$, attached to its under side, the india-rubber strips being on the upper surface of the slide-bar and serving as an effectual cut-off. There are also placed in each hopper O two cross-rods, $s\ s$, one at each side of the plate $g$ and at equal distances from it, as shown clearly in Fig. 3.

To the side bar, Q, there is attached a lever, R, which extends up through the bar P, and is connected by a fulcrum-pin, $t$, to an upright, $u$, on said bar.

To one side of the frame A there is attached an adjustable step, $v$, for the axle C. (See Fig. 1.)

The operation of the machine is as follows: As the machine is drawn along, an operator vibrates the lever R, and consequently the slide-bar Q, and the corn is distributed from the hoppers O O by the apertures $p$. The india-rubber strips $r$, at the bottoms of the plates $g$, form efficient cut-offs, and at the same time effectually prevent the cutting or bruising of the seed as the filled apertures $p$ pass under them, while the rods $s$ serve to insure the filling of the apertues $p$, smoothing off the tops of the apertures as the latter pass under them and allowing vacant spaces in the apertures to fill with seed. The shares M and cutters L may be elevated at any time to clear obstructions or when the machine is turning at the ends of rows by the driver depressing with his foot the front end of treadle J, the shares M being thrown forward and upward in a curve by means of the crank-shaft K, the bar P, to which the hoppers O are attached, permitting, in consequence of the joints $b$, such movement.

When the machine is to be moved from place to place the driver simply backs the team, and the bar I will serve as a "spur," preventing the backward movement of the wheels B, and thereby causing the frame A to be elevated by the movement of the crank-shaft C. By this arrangement the shares M G are elevated above the surface of the ground, the frame A being retained in an elevated state by the pawl $c$ and wheel $b$.

The shares or plows G may be shifted or turned laterally, as occasion may require, to cultivate the soil between the furrows made by the shares M M, and the inclination of the shares G, by adjusting the pins $i$, may be regulated as required, as previously stated.

We do not claim the reciprocity seed-slide Q, perforated near its ends within the hoppers O, for that has been previously used; neither do we claim central shares or plows, G, irrespective of the arrangement herein shown and described; but We do claim as new and desire to secure by Letters Patent—

1. The arrangement of the adjusting-cutters L with the hinged seed-boxes O, oscillating seed-tubes N, and lever J, substantially as and for the purposes herein shown and described.

2. The arrangement of the double crank-axle with the frame A and spur I, substantially as and for the purposes herein shown and described.

3. The arrangement of the adjusting-bars H H with the adjustable standard-bars E E and frame A, in the manner and for the purpose herein shown and described.

JOSEPH STONE.
JAMES T. ARCHIBALD.

Witnesses:
DAVID McMICHAEL,
JOHN F. SAUNDERS.